(12) United States Patent
Meron et al.

(10) Patent No.: US 11,475,079 B2
(45) Date of Patent: *Oct. 18, 2022

(54) SYSTEM AND METHOD FOR EFFICIENT MULTI STAGE STATISTICAL WEBSITE INDEXING

(71) Applicant: PAYPAL, INC., San Jose, CA (US)

(72) Inventors: Avishay Meron, Holon (IL); Yarden Raiskin, Giv'atayim (IL)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,921

(22) Filed: Nov. 30, 2020

(65) Prior Publication Data

US 2021/0081465 A1 Mar. 18, 2021

Related U.S. Application Data

(63) Continuation of application No. 16/203,190, filed on Nov. 28, 2018, now Pat. No. 10,936,677.

(51) Int. Cl.
*G06F 16/00* (2019.01)
*G06F 16/951* (2019.01)
*G06F 16/906* (2019.01)
*G06F 16/31* (2019.01)
*G06F 16/957* (2019.01)

(52) U.S. Cl.
CPC .......... *G06F 16/951* (2019.01); *G06F 16/313* (2019.01); *G06F 16/906* (2019.01); *G06F 16/957* (2019.01)

(58) Field of Classification Search
CPC .... G06F 16/951; G06F 40/284; G06F 16/906; G06F 16/313; G06F 16/957
See application file for complete search history.

(56) References Cited

U.S. PATENT DOCUMENTS

| | | |
|---|---|---|
| 2015/0106157 A1 | 4/2015 | Chang et al. |
| 2016/0055132 A1 | 2/2016 | Garrison et al. |
| 2017/0091270 A1 | 3/2017 | Guo et al. |
| 2017/0185680 A1 | 6/2017 | Tang et al. |
| 2018/0225280 A1* | 8/2018 | Dugan ............ G06N 20/00 |
| 2018/0253496 A1 | 9/2018 | Natchu |
| 2018/0365710 A1* | 12/2018 | Halecky ............ G06F 16/35 |
| 2019/0043095 A1 | 2/2019 | Grimaud et al. |
| 2019/0258719 A1 | 8/2019 | Baker et al. |
| 2019/0294642 A1 | 9/2019 | Matlick et al. |
| 2020/0050707 A1 | 2/2020 | Tsykynovskyy |
| 2020/0372085 A1* | 11/2020 | Takata ............ G06F 17/18 |

FOREIGN PATENT DOCUMENTS

CN          108874996 A  *  6/2018

* cited by examiner

*Primary Examiner* — Alexander Khong
(74) *Attorney, Agent, or Firm* — Haynes and Boone, LLP

(57) ABSTRACT

Aspects of the present disclosure involve systems, methods, devices, and the like for classifying or indexing websites using an efficient multistage statistical indexing scheme. In one embodiment, a system is introduced that includes a plurality of models for classification. The classification and indexing may be obtained using at least two models designed to retrieve information from a website visited for marketing and assessing a user. In one embodiment, a first model, content-based features are used for the classification and in making predictions of the unlabeled observations. In another embodiment, a second model includes embedded technology-based features for further classification.

20 Claims, 7 Drawing Sheets

| URL | PAYMENT PROVIDER COUNT | ANALYTICS COUNT | WEB SERVER COUNT | MOBILE COUNT | SOCIAL MEDIA COUNT |
|---|---|---|---|---|---|
| www.abcd.com | 10 | 3 | 1 | 2 | 9 |
| www.ef.ghis.com | 2 | 9 | 20 | 4 | 4 |
| www.qrst.ww.mn.com | 6 | 0 | 15 | 2 | 1 |
| www.index.com | 4 | 5 | 1 | 5 | 2 |
| www.catdog.com | 2 | 2 | 10 | 5 | 7 |
| www.zigzag.com | 3 | 1 | 3 | 1 | 1 |

FIG. 4

SYSTEM AND METHOD FOR EFFICIENT MULTI STAGE STATISTICAL WEBSITE INDEXING

RELATED APPLICATIONS

This application is a continuation of U.S. application Ser. No. 16/203,190, filed Nov. 28, 2018 and entitled, "System and Method for Efficient Multi Stage Statistical Website Indexing," which is incorporated herein by reference in its entirety.

TECHNICAL FIELD

The present disclosure generally relates to communication devices for determining website content, and more specifically, to communication devices for determining website content using a multistage statistical scheme.

BACKGROUND

In the advent of technology, users have moved to the use of electronic devices as a source of communication in everyday life. Such use often includes the interaction and access of internet websites for news, social content, purchases, and the like. In some instances, the content and website frequented may provide insight about the user. For example, a user's searches may provide an indication of a topic, event, or item of interest to the user. As another example, blogs followed, and social media interactions can provide insight on a user's likes/dislikes. Still as another example, merchant sites frequented can provide awareness on a user's style and purchasing patterns. However, with the vast amount of information and websites visited, make use of such information may be too cumbersome to use. Therefore, to manage and adequately use the details regarding user frequented websites, it would be beneficial to create a system that can determine website content in a fast and efficient way.

BRIEF DESCRIPTION OF THE FIGURES

FIG. 4 illustrates table diagram of the use of second stage in the implementation of an efficient statistical web indexing scheme.

Figure 1:
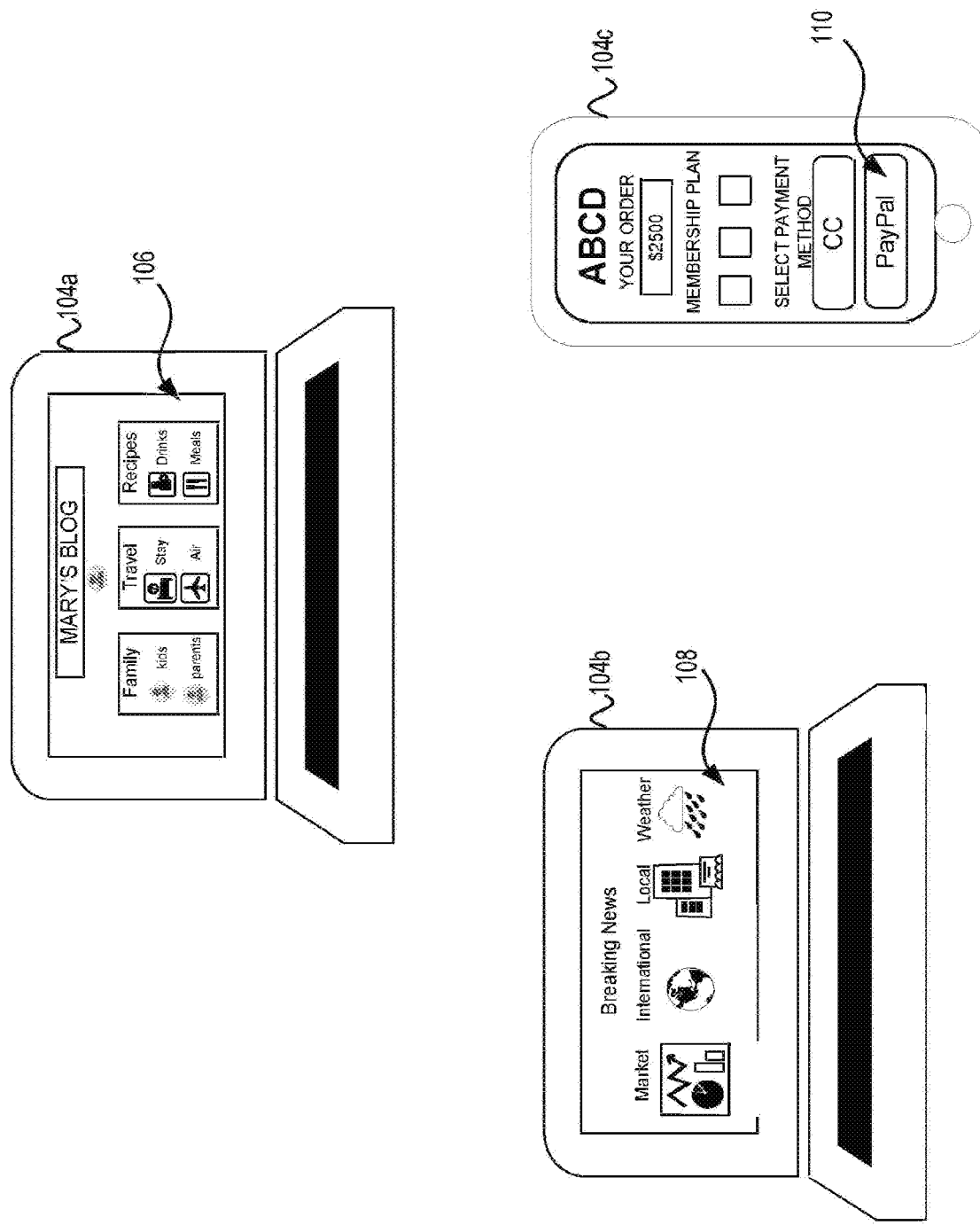
FIG. 1 illustrates exemplary devices and user frequented websites.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for classifying or indexing websites using an efficient multistage statistical indexing scheme. In one embodiment, a system is introduced that includes a plurality of models for classification. The classification and indexing may be obtained using at least two models designed to retrieve information from a website visited for marketing and assessing a user. In a first model, content-based features are used for the classification and in making predictions of the unlabeled observations. A second model includes embedded technology-based features for further classification.

Conventionally, accessing and using website information may entail the tracking of user's interactions with website(s) to determine a best product, advertisement, or recommendation to make to a user. However, with the vast amount of information currently available, tailored recommendations and insights may not be possible and/or the amount of detail that may be captured and used from the user's visit to the website may be limited. For example, consider FIG. 1 which illustrates exemplary websites that may be frequented by a single user on a user device 104.

The user device can include one or more smart devices enable to communicate with a network. The communication can include wired and/or wireless communications. Additionally, the user device 104 can include but is not limited to a smart phone, laptop, tablet, desktop, smart watch, goggles, VR equipment, and the like. As illustrated, the number and range of sites are many. Illustrated at FIG. 1, on device 104 for example is a blog site 106 frequented by the user. This blog site 104 may below to Mary whose interests include family, travel, and food. Therefore, from the blog site 104 frequented, an observation can be made that the user shares a sentiment for family, food, and/or travel. If the user in this exemplary blog site 106 is Mary, then further inferences may be made as well as associations based on the details presented on the blog site 106. Next, turning to user device 104, a news site 108 is being frequented by the user. From this visit and through the observation of the stories followed and visited by the user, further insight into the interests of the user may be obtained. For example, a user may read an article of the news site that discusses a recent astronomical discovery. From the visitation, a first assessment can be made that a user is interested in astronomy. Now assume the user clicks through and follows other related articles on the discovery, the probability that the user has this interest has increased. Similarly, considering a merchant website 110 visited by the user on another user device 102. Merchant, transactional, spending habits can also be accessed. Unfortunately, the amount of information available on a site and the number of sites available are is very voluminous and parsing, and understanding the context can be very time consuming and complex. Thus, the recommendations that may be presented to the user may be somewhat limited. In addition, marking, advertising, profiling, and even risk assessment may be somewhat incomplete without an accurate account of content on the sites. Therefore, in order to leverage information from a website for a more accurate advertisement, profile, risk assessment would be beneficial.

Figure 2:
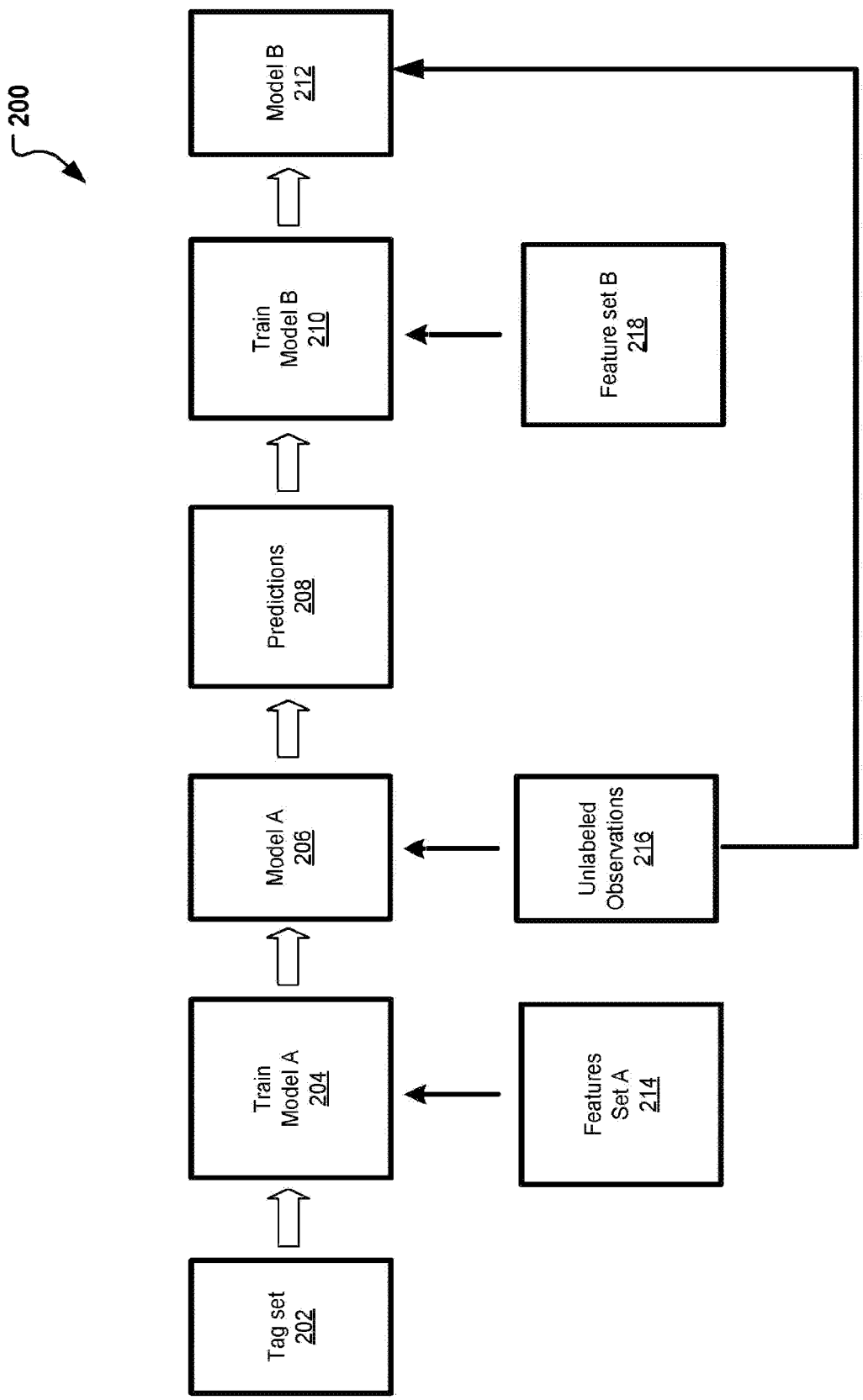
FIG. 2 illustrates a diagram of the implementation of an efficient multistage statistical web indexing scheme.

In one embodiment, a system and method that performs web indexing is presented. In particular, a system and method for determining website content using a multistage statistical scheme is presented. Turning to FIG. 2, a diagram illustrating such system is shown. This indexing or multistage statistical scheme is developed to leverage information from a website in order to identify the content on the website. Because this scheme entails indexing, a first approach is to group the websites according to content type. Such indexing could be useful and can provide additional insight if business use cases are considered during the groupings. Thus, the grouping could be created based on content and risk behavior associated with the content. For example, websites could be grouped as online merchants, image sites, blogs, news sites, service booking sites, etc. Next, it could be determined that with online merchants, users have a higher probability of engaging in fraudulent activity. As another example, statistical data may demonstrate that certain blog sites are often visited by customers with lower credit scores. Still as another example, it is known that users who visit merchants who sell outdoor camping equipment frequently have year-round state park permits. Therefore, with this detail in mind, website groupings can be more intelligently completed and recommendations, risks, advertisements, etc. may be more easily captured and/or presented.

Then, once the websites are grouped, the URLs and the content on the websites may be crawled in search for specific content for further processing. That is to say, once websites of interest are grouped, a next step can include scanning the content of the website in order to obtain further details on the site so that better recommendations and assessments can be made about the site and/or the user.

To enable such indexing embodiment, a learning set or labeled observations should first be created so that websites visited are properly grouped. For example, if a user navigates to www.ebay.com, then website should be recognized and labeled as an online merchant.

In one embodiment, a supervised learning approach is considered for the implementation. A difficulty that often arises in dealing with vast amount of data in a supervised learning environment, is in creating a reliable learning set. This difficulty is particularly challenging when manual labeling is involved, as this can be a very expensive and limited operation. Generally, to obtain a stable model for a schema of this extent can impose an amount of observations equivalent to an exponential function of the number of features. Therefore, to reliably have a stable model, a small number of features should be used. Note that a stable model can be defined as a model whose false positive and false negative rates on a test set do not change significantly with respect to the training set provided.

Therefore, with this in mind, in one embodiment, the web indexing schema of FIG. 2 is introduced where two training models work jointly to generate a multistage classification process 200 that produces a more stable model with less false negatives encountered. As a first step, the multistage classification process 200 begins with the tagging of the data set to generate the tagged set 202. The tagged set can include random sampled observations that have been selected to produce the tagged set. In some instances, these observations (e.g., websites) may be randomly selected and electronically tagged, while in other instances manual tagging may occur. In one exemplary embodiment, manual labeling of websites occurs for this supervised learning problem. Note that in supervised learning the data mining task includes making inferences using labeled training data where the set includes a typical input (e.g., marketplace website) and a desired output value (e.g., online merchant).

Another component in supervised learning includes having an input feature representation of the learned function. Generally, the observation can be transformed into an input vector which includes a number of features that are descriptive of the object. For example, consider fruit as the input observation, features associated with the fruit can include the color, shape, and size. Here, the object of interest is a website, as such a feature set can include features that describe the content of the site.

Next, considering that a multistage classification process 200 is introduced, two distinct feature sets 214, 218 are consequently introduced. The first feature set may be designed an selected to be small enough to learn a stable model from with a small training set while the second feature set may be larger since a larger training set will be available from the first model A. As indicated, because the object of interest is a website, two sets of features can be developed considering two different domains. A first domain can be the web site content or text in the web site and can be used to create the first feature set, while the second domain can include the website technologies and used for the second feature set. The website technologies can include underlying technologies used to create the website and support service the website offers.

Turning to FIG. 2, Feature Set A 214 can therefore include visible text on the web site and used to train model A 204. Various methods are available for feature engineering from text. In one exemplary embodiment, a term frequency-inverse document frequency (TFIDF) method may be used. TFIDF is statistical representation or number which can provide insight on the importance of a word in a document. The TFIDF may be computed as a product of how frequent a word is used in a document times how unique the word is with respect to the document as a whole. Therefore, using TFIDF, a set of text related features may be identified from which a small number of them are selected and used to train model A 204.

In one embodiment, the model may be tuned for improved or higher accuracy. Tuning the model may be used to achieve a low false positive rate with a possible impact or expense to false negative. Tuning the model may be used to provide predictions 208 with higher accuracy output from model A 206, which in turn can be used as labeled observations for training 210 the second model 212. Therefore, at FIG. 2, Model A 206 receives the unlabeled observations 216 and makes predictions 208 which can be used to train model B 210.

As previously indicated, Model B 212 can include distinct and independent features as compared to those used with Model A 206. In one embodiment, the feature set B 216 can include technologies used by the website. Technologies used by the website can be provided by various vendors and can include cart technologies for online merchants, analytics tools for measuring traffic activity, and site schemes for customizing visual design. Generally, each of the technologies have indications which may be found in the site source code. these indications may be extracted by parsing the html tags and the java script of the website. Since there are many available technologies many features may be generated for the prediction task. In order to make sure the classifier prediction is stable, a large amount of prediction 208 using model A 206 and labeled. In turn, the predictions 208 with high score generated by model A 206 are used as training observations 210 to model B 212. With the unlabeled observations 216 then fed model B to achieve accurate web indexing. To implement the multistage classification process 200 an indexing module or component may be incorporated and design to analyze the unlabeled websites, extract the features, and make accurate predicts for better recommendations and user assessment. Such component may be incorporated into a system similar to that disclosed below (e.g., data classification component) and in conjunction with FIG. 6.

Figure 3:
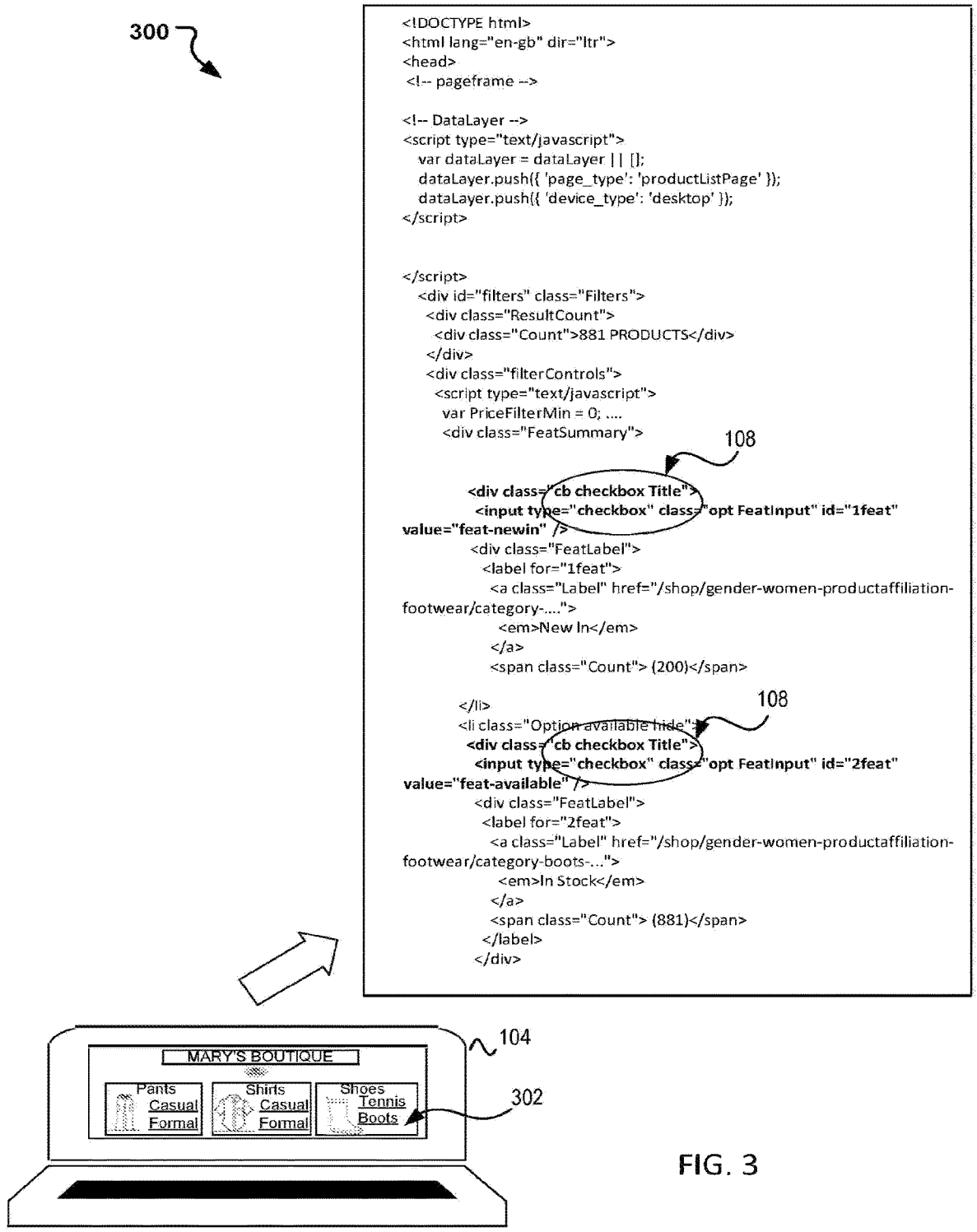
FIG. 3 illustrates the implementation of feature set A 214 for obtaining text from the website in the implementation of the first stage of the multistage webindexing scheme.

Turning next to FIG. 3, a diagram illustrating an exemplary use of website content for web indexing. In particular, FIG. 3 illustrates the implementation of feature set A 214 for obtaining text from the website in the implementation of the first stage of the multistage webindexing scheme. To illustrate the implementation of the first feature set (e.g., feature set A), user device 103 is presented with a website open and available for user interaction. In one exemplary embodiment, the website 302, is a merchant website used for the sale of goods. As an example, the merchant website is for Mary's Boutique who sells clothing items. The clothing items can include but are not limited to pants, shirts, shoes, etc.

Turning to the implementation of the multistage classification process 200, a first stage in the multistage classification process 200 includes the use of a first feature set which uses web content for website indexing. Herein, website 302 may be an unlabeled observation that is received by the first model. The first model may then scan/crawl on the content of the website 302 to make a first determination as to a type of site being presented. As may have been previously determined, certain terms may be associated with a merchant site. Here, as illustrated in the source representation, a term associated with the merchant site can include "checkout" 308. Therefore, by scanning the source of the website visited by a user, an initial classification of the site may be made because certain recognized terms are identified which are used to index the website as a merchant site. In this exemplary embodiment, "checkout" may be a recognized term, however other terms may be contemplated.

As previously indicated, the recognized terms are a set of predefined features (e.g., features based on HTML context) which may be obtained using scanning techniques that may incorporate statistical measures in determining the features. In one embodiment, term frequency-inverse document frequency (TFIDF) method may be used. TFIDF is statistical representation or number which can provide insight on the importance of a word in a document. The TFIDF may be computed as a product of how frequent a word is used in a document times how unique the word is with respect to the document as a whole. Thus, terms associated with various websites or indicators may be identified. For crawling/scanning through the text, a crawling technology or component can be implemented in conjunction with FIG. 2, for identifying features and generating the desired feature set A 216.

In one example, a key indicator for an online merchant website may be the presence of an image with a price tag. As another example, a key indicator of an online merchant site may be a cart image, a checkout or cart text embedded on the site. Thus, the presence of the indicators whether on the site itself as an image, text, or in the source may be used as features used by model A for classifying the websites. Note that those features or indicators mentioned are not so limited and features may be identified beyond those listed and mentioned. Also note that a similar approach may be used to identify and extract the features on other websites includes those which are blogs, news sites, image sites, service booking sites, etc.

Turning next to FIG. 4, a diagram illustrating an exemplary use of embedded technologies for web indexing. In particular, FIG. 4 illustrates the implementation of feature set B 216 for information from the website in the implementation of the second stage of the multistage webindexing scheme (e.g., multistage classification process 200). To illustrate the implementation of the second a second set of features are distinguished, illustrated and explained.

Nowadays, vendors offer various kinds of website technologies that may be added and embedded onto a website based on the use and type of site. Because the cost of such technologies is relatively low (or even free), integrating such technologies when the website is being built, can generally be a seamless task requiring only that the technology be integrated/embedded without a need for implementation. As such, the technologies embedded on a site may be used as second set of features that can be used with the second model (e.g., model B 212) for webindexing the unlabeled observations 216.

In other words, technologies embedded within the website can provide strong indicators/indications of the type of page the website is. For example, a website built with "Shopify" platform gives a strong indication that the website is a merchant website. As another example, an embedded payment method can also give a strong indicator of a merchant website. Still as another example, the presence of certain Wordpress technologies can give a strong indicator a blog website.

In some instance, however, detection the embedded technologies may not be very trivial and instead require a deeper crawling and parsing of the entire website. Detection of technologies embedded in a web site is not trivial and involves deep crawling and parsing of the entire web site. Additionally, some websites may use more than one of the embedded technologies. As such, a crawling technology or component can be implemented in conjunction with FIGS. 2 and 6, for identifying features and generating the desired feature set B 218. In some instances, the crawling component maybe the same or a share module within the crawling component used for feature extraction of model 206.

Note that in some instances, a large feature set may be generated and to distinguish which technology is used, a Boolean feature of each technology may be generated or alternatively the related technologies may be grouped and the count of each type of technology used for each website may be determined. This operation may be performed by a separate counter that may standalone or may be integrated with the crawling component for performing one or more of the operations used in feature extraction and determination.

Turning to FIG. 4, a listing of exemplary technologies that may be identified in various websites are counted. Take for example, website www.abcd.com, this type of website has a large payment provider count, which may be interpreted as having a large number of ways to take and receive payments. Additionally, this website, may also have a large media count. Thus, the products on a website may be advertised on social media and/or accessible through social media. Assuming that www.abcd.com was a merchant site, then it may be determined that merchant websites are those that generally have larger payment provider and social media count and these features may be added to the feature set and attributed to a merchant site when the model is classifying the websites. Similarly, other technology groups may be combined and used as features as indicators of a certain website. Therefore, any unlabeled observations 216 may be classified (website indexed) based at least in-part on the feature set B 218 used in conjunction with Model B 212.

Figure 5:
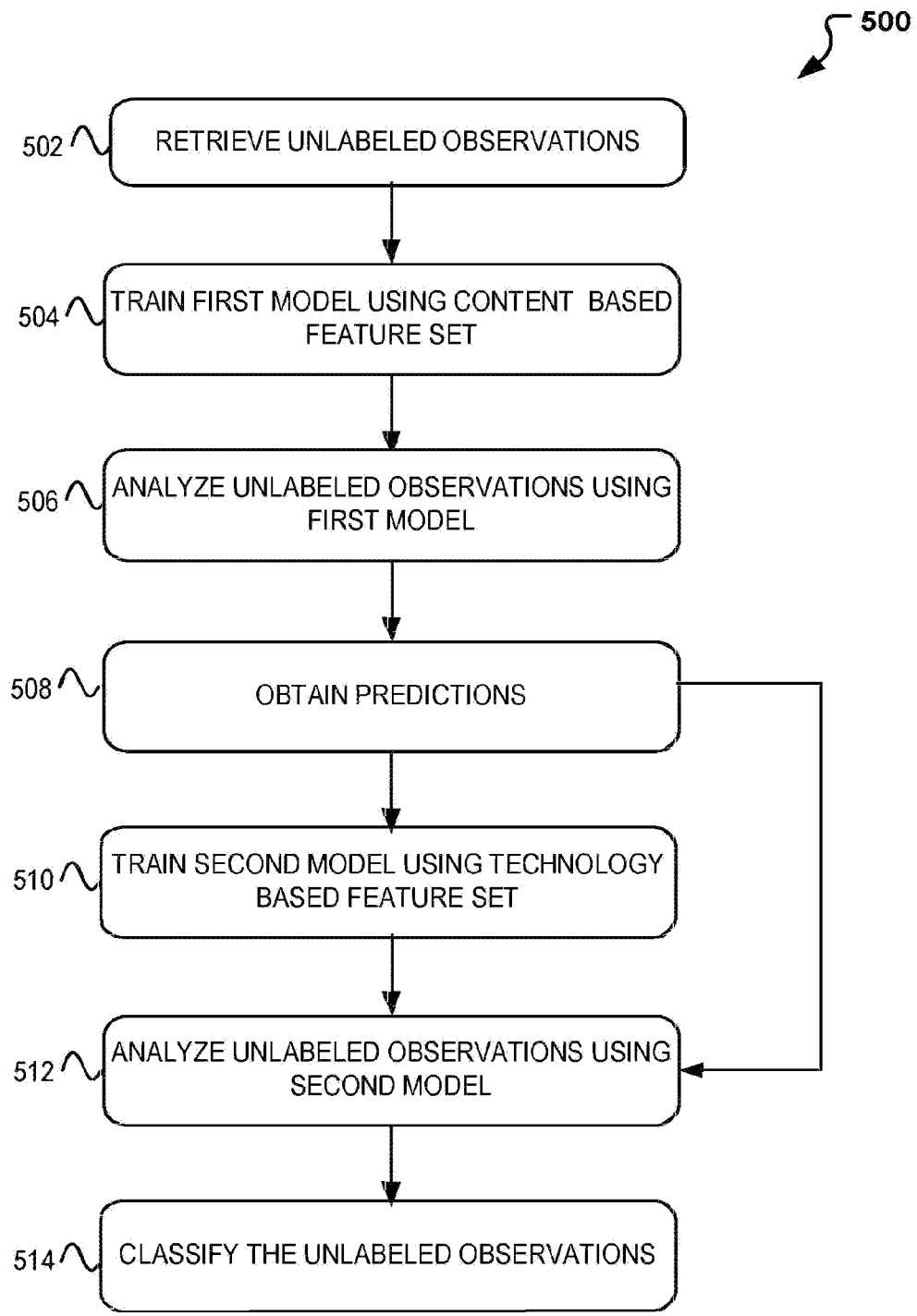
FIG. 5 illustrates a flow diagram illustrating operations for the implementation of an efficient multistage statistical web indexing scheme.

Next at FIG. 5, an example process 500 for the implementation of an efficient multistage statistical web indexing scheme implemented by a system and method such as that presented above and in conjunction with FIG. 2 presented. In particular, FIG. 5 illustrates a flow diagram illustrating operations for obtaining a recommendation score using the multistage classification process presented. According to some embodiments, process 500 may include one or more of operations 502-514, which may be implemented, at least in part, in the form of executable code stored on a non-transitory, tangible, machine readable media that, when run on one or more hardware processors, may cause a system to perform one or more of the operations 502-514.

Process 500 may begin with operation 502, where a system retrieves unlabeled observations available for processing. The unlabeled observations may include websites visited by one or more users. These websites can include blogs, news sites, merchant websites, images sites, etc. Processing of the unlabeled observations can include indexing tor classifying the websites using website content and embedded technologies. Classifying the websites is a useful scheme that may be used for providing a user more tailored information based on content and websites visited. Additionally, classification of the websites may be useful to merchants and payment providers who can use the website information gathered to market, profile, and make a risk assessment on a user.

To process the unlabeled observations available, a multistage classification schema is introduced. The multistage classification schema is a multistage web indexing technique introduced which uses both content on a website and embedded technologies within the site to determine the type of website visited. The first stage in the multistage classification schema includes a first model trained by a first feature set that used the website content to analyze the unlabeled observations. Therefore, as presented at operation 504, the first model is trained using the content-based feature set. The content-based feature set may be determined using visible text on the web site and used to train the first model. Various methods are available for feature engineering from text. As indicated, a TFIDF method may be used. TFIDF is statistical representation or number which can provide insight on the importance of a word in a document. The TFIDF may be computed as a product of how frequent a word is used in a document times how unique the word is with respect to the document as a whole. Therefore, using TFIDF, a set of text related features may be identified from which a small number of them are selected and used to train the first model.

At operation 506, process 500 continues to analyze the unlabeled observations using the first model make and obtain predictions at operation 508. The predictions may be a first analysis of the unlabeled observations which can be further refined or more accurately classified during a second stage of the multistage classification schema of process 500. In other instances, some unlabeled observations may have not been classified or properly classified, in which case, the second stage of process 500 can complete.

At operation 510, a second feature set may be presented and used to train the second model. The second feature set may be features generated based on embedded technologies that may appear on the websites that may be used in the classification. The technologies embedded on a site may be used as second set of features that can be used with the second model for webindexing the unlabeled observations. For example, as previously indicated, technologies embedded within the website can provide strong indicators/indications of the type of page the website is. For example, a website built with "Shopify" platform gives a strong indication that the website is a merchant website. As another example, an embedded payment method can also give a strong indicator of a merchant website. Still as another example, the presence of certain Wordpress technologies can give a strong indicator a blog website. With the second feature set identified, the second model may be trained and used to analyze the unlabeled observations. As indicated, the unlabeled observations may include those already classified by the first model and/or those that were incorrectly indexed, and/or those not analyzed yet.

Continuing with process 500, at operation 514, the classification or indexing of the unlabeled observations is completed and may be used to make those observation, recommendations, profiling or flagging users for adequate marketing or risk assessment.

Note that although process 500 is described to include the use of two models in the multistage classification scheme, more or less models may be used. Additionally, the features used and order of features may vary. In addition, training one or more of the models may occur prior to, in conjunction with the retrieval of the unlabeled observations. Alternatively, the feature set(s) may be obtained and both models trained simultaneously. Further, one or more of the operations may varying order and process 500 is presented herein for exemplary purposes. Further, the webindexing results may be presented to a user on a mobile device, smart phone, laptop, desktop, or other device available to present the recommendation. Details on such device are described below and in conjunction with FIG. 7.

Figure 6:
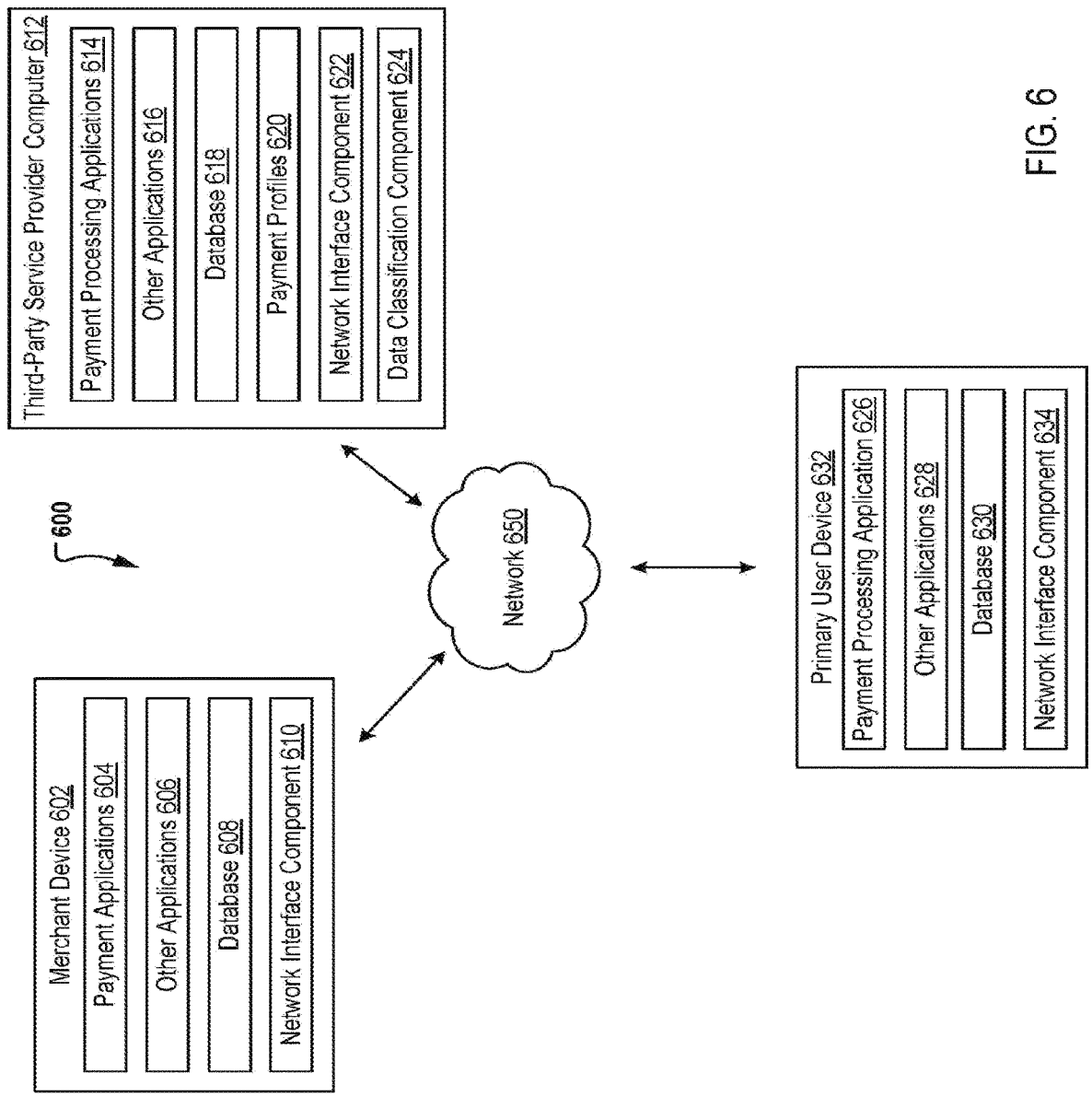
FIG. 6 illustrates a block diagram of a system for efficient multi stage website indexing.

FIG. 6 is a block diagram of a networked system 600 for implementing the processes described herein, according to an embodiment. In particular, FIG. 6 illustrates a block diagram of a system 600 efficient multistage statistical website indexing. As shown, system 600 may include or implement a plurality of devices, computers, servers, and/or software components that operate to perform various methodologies in accordance with the described embodiments. It will be appreciated that the devices, computers, and/or servers illustrated in FIG. 6 may be deployed differently and that the operations performed, and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 600 includes a merchant or other third-party device 602, a primary user device 632, a third-party service provider computer 612 in communication over a network 650. These devices 602, 632, and 612 are exemplary devices that may interact during a transaction and in communication with a website for performing a transaction and used in conjunction with the multistage indexing method/process presented and described above and in conjunction with FIG. 5.

The merchant device 602, primary user device 632, and the third-party service provider computer 612 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 600, and/or accessible over network 650.

The merchant device 602 may be implemented as a communication device that may utilize appropriate hardware and software configured for wired and/or wireless communication with the primary user device 632 and third-party service provider computer 612. For example, the merchant device 602 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, servers, and/or other types of computing devices capable of transmitting and/or receiving data. The merchant device 602 may correspond to and be utilized by a user, such as an employee of a merchant and/or another person authorized by the merchant, or independently as a standalone system.

The merchant device 602 may include one or more payment applications 604, other applications 606, a database 608, and a network interface component 610. The payment applications 604 and other applications 606 may correspond to executable processes, procedures, and/or applications with associated hardware. In other embodiments, merchant device 602 may include additional or different components having specialized hardware and/or software to perform operations associated with the payment applications 604 and/or the other applications 606.

The payment application 604 may facilitate financial transactions corresponding to the sale of goods and/or services offered by the merchant. For example, the payment application 604 may provide an interface for customers to purchase the goods or services, make a contribution, and to receive customer payment information (e.g., customer credit card information). The payment application 604 may further transmit customer payment information to a payment processor (e.g., such as a payment processor corresponding to the third-party service provider computer 612) to process the customer payment information. The payment application 604 may also facilitate other types of financial transactions such as banking, online payments, money transfer, donations, and/or the like.

The merchant device 602 may execute the other applications 606 to perform various other tasks and/or operations corresponding to the merchant device 602. For example, the other applications 606 may include security applications for implementing client-side security features, programmatic client applications for interfacing with appropriate application programming interfaces (APIs) over network 650, or other types of applications. In various embodiments, the other applications 606 may include social networking applications. Additionally, the other applications 606 may include device interfaces and other display modules that may receive input and/or output information. For example, the other applications 606 may include a graphical user interface (GUI) configured to provide an interface to the user.

The merchant device 602 may further include a database 608, which may be stored in a memory and/or other storage device of the merchant device 602. The database 608 may include, for example, identifiers (IDs) such as operating system registry entries, cookies associated with the payment application 604 and/or other applications 606, IDs associated with hardware of the network interface component 610, IDs used for payment/user/device authentication or identification, and/or other appropriate IDs. The database 608 may also include information corresponding to one or purchase transactions of customers who have purchased goods or services from the merchant, browsing histories of the customers, or other types of customer information. In certain embodiments, the merchant device 602 may also include information corresponding to payment tokens, such as payment tokens generated by the third-party service provider computer 612.

The merchant device 602 may also include at least one network interface component 610 configured to communicate with various other devices such as the primary user device 132, and/or the third-party service provider computer 612. In various embodiments, network interface component 610 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 612 may be maintained, for example, by a third-party service provider, which may provide payment processing services for the merchant. In one example, the third-party service provider may be provided by PAYPAL™ Inc. of San Jose, Calif., USA. Alternatively, the third-party service provider computer 612 may be associated with a user of the primary device 632. As such, the third-party service provider computer 612 includes one or more payment processing applications 614, which may be configured to process payment information received from the merchant device 602 or from a selection at the primary user device 632. For example, the payment application 604 of the merchant device 602 may receive payment information from a customer to purchase a service or good offered by the merchant. Upon receipt of the payment information, the payment application 604 may transmit the payment information to the third-party service provider computer 612. The payment processing application 614 of the third-party service provider computer 612 may receive and process the payment information. As another example, the payment application 604 can present a payment code on a display of the user device associated with the merchant. The payment code can be scanned or transmitted to the merchant device 602 for payment processing. Still as another example, the payment processing application can present a successful transaction notification on the display of the user device when the application has been authorized and ready for post-processing.

The third-party service provider computer 612 may execute the other applications 616 to perform various other tasks and/or operations corresponding to the third-party service provider computer 612. For example, the other applications 616 may include security applications for implementing client-side security features, programmatic client applications for interfacing with appropriate APIs over the network 650, or other types of applications. The other applications 616 may also include additional communication applications, such as email, texting, voice, and IM applications that enable communication of emails, calls, texts, and other notifications through the network 650. In various embodiments, the other applications 616 may include location detection applications, such as a mapping, compass, and/or GPS applications, which may be used to determine a location of the third-party service provider computer 612. Additionally, the other applications 616 may include device interfaces and other display modules that may receive input and/or output information. For example, the other applications 616 may include a GUI configured to provide an interface to one or more users.

The third-party service provider computer 612 may further include a database 618, which may be stored in a memory and/or other storage device of the third-party service provider computer 612. The database 618 may include, for example, IDs such as operating system registry entries, cookies associated with the payment processing application 614 and/or other the applications 616, IDs associated with hardware of the network interface component 622, IDs used for payment/user/device authentication or identification, transaction IDs, and/or other appropriate IDs.

According to a particular embodiment, the third-party service provider computer 612 may include a set of payment profiles 620 corresponding to past sales transactions executed by the merchant device 102 with respect to one or more customers of the merchant. Alternatively, the third-party service provider computer 612 may include a set of merchant payment profiles corresponding to the payment sources associated to a corresponding merchant. For example, a particular payment profile from the set of payment profiles 620 may include payment information corresponding to a particular customer of the merchant and/or a merchant associated with a user. The payment information may include credit card information (e.g., encrypted card number, expiration date, security code, card issuer, and/or the like), Automated Clearing House (ACH) information (e.g., encrypted account number, routing number, and/or the like), identification information associated with the particular customer/user (e.g., a customer identifier, name, address, phone number, date of birth, and/or the like), billing information, credit score, and/or any other type of payment information associated with the particular customer. Furthermore, other payment profiles of the set of payment profiles 620 may include payment information corresponding to other customers of the merchant and/or other merchants associated with the user. In addition, the third-party service provider computer 612 may store the set of payment profiles 620 according to a first file format.

The third-party service provider computer 612 may also store a set of payment tokens corresponding to the set of payment profiles 620. For example, each payment profile of the set of payment profiles 620 may be associated with a corresponding payment token from the set of payment tokens. In some embodiments, each payment profile may include a corresponding payment token from the set of payment tokens. The set of payment tokens may be particular to the third-party service provider computer 612 (e.g., computers from other service providers may be unable to use the set of payment tokens) and may enable the merchant device 602 to more securely process payment transactions with the third-party service provider computer 612. For example, in order to process a payment transaction that involves a credit card number associated with a particular payment profile, the third-party service provider computer 612 may provide the merchant device 602 with a particular payment token that is different from the credit card number. The merchant device 602 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 602.

In various embodiments, the third-party service provider computer 612 also includes at least one network interface component 622 that is configured to communicate with the merchant device 602 and/or the primary user device 632 via the network 650.

The third-party provider computer 612, may also include a data classification or indexing component 624 that may be used for website classification. In one embodiment, the website(s) visited may be acquired by a user of a third-party service provider computer 612 and/or stored in database 618, user device, merchant device, etc. that can be analyzed to identify websites visited by the user for use in making recommendations, profiling, risk assessment, marketing to a user, etc. The data classification component 624 may include the clawling, scanning, and similar technology used in feature extraction. Additionally, the data classification component can include the one or more models and can alternatively or additionally reside in the primary user device 632 and/or merchant device 602.

The primary user device 632 may be implemented as a communication device that may utilize appropriate hardware and software configured for wired and/or wireless communication with the merchant device 602 and third-party service provider computer 612. The primary user device 632, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 632 may be mobile device communicating with wearable device (or secondary user device), merchant device 602, or directly with the third-party service provider system 612.

The primary user device 632 may include a payment processing application 626 that may be used as a digital wallet that can communicate with a merchant device 602, a secondary user device, and/or third-party service provider 612 for purchasing and transacting. The payment processing application 626, can work jointly with database 630 for retrieving bank account information, user accounts, security codes, tokens that may be associated with various merchant locations, charities, and other relevant causes. Similarly, the payment processing application, can also provide access the user profiles for determining which payment method, processing code, and/or recommendation or tailored information to provide.

The primary user device 632 may also include other applications 628 to perform various other tasks and/or operations corresponding to the primary user device 632. For example, the other applications 628 may facilitate communication with the merchant device 602, such as to receive an indication, from the merchant device 602, to switch payment processing services from the third-party service provider to the service provider.

The primary user device 632 may further include a database 630, which may be stored in a memory and/or other storage device of the primary user device 632. The database 630 may include, for example, identifiers (IDs) such as operating system registry entries, cookies associated with a web browser and/or the other applications 628, IDs associated with hardware of the network interface component 634, IDs used for payment/user/device authentication or identification, bank information, merchant information, user accounts, and/or other appropriate IDs.

The primary user device 632 may also include at least one network interface component 634 configured to communicate with various other devices such as the merchant device 602 and/or the third-party service provider computer 612.

Figure 7:
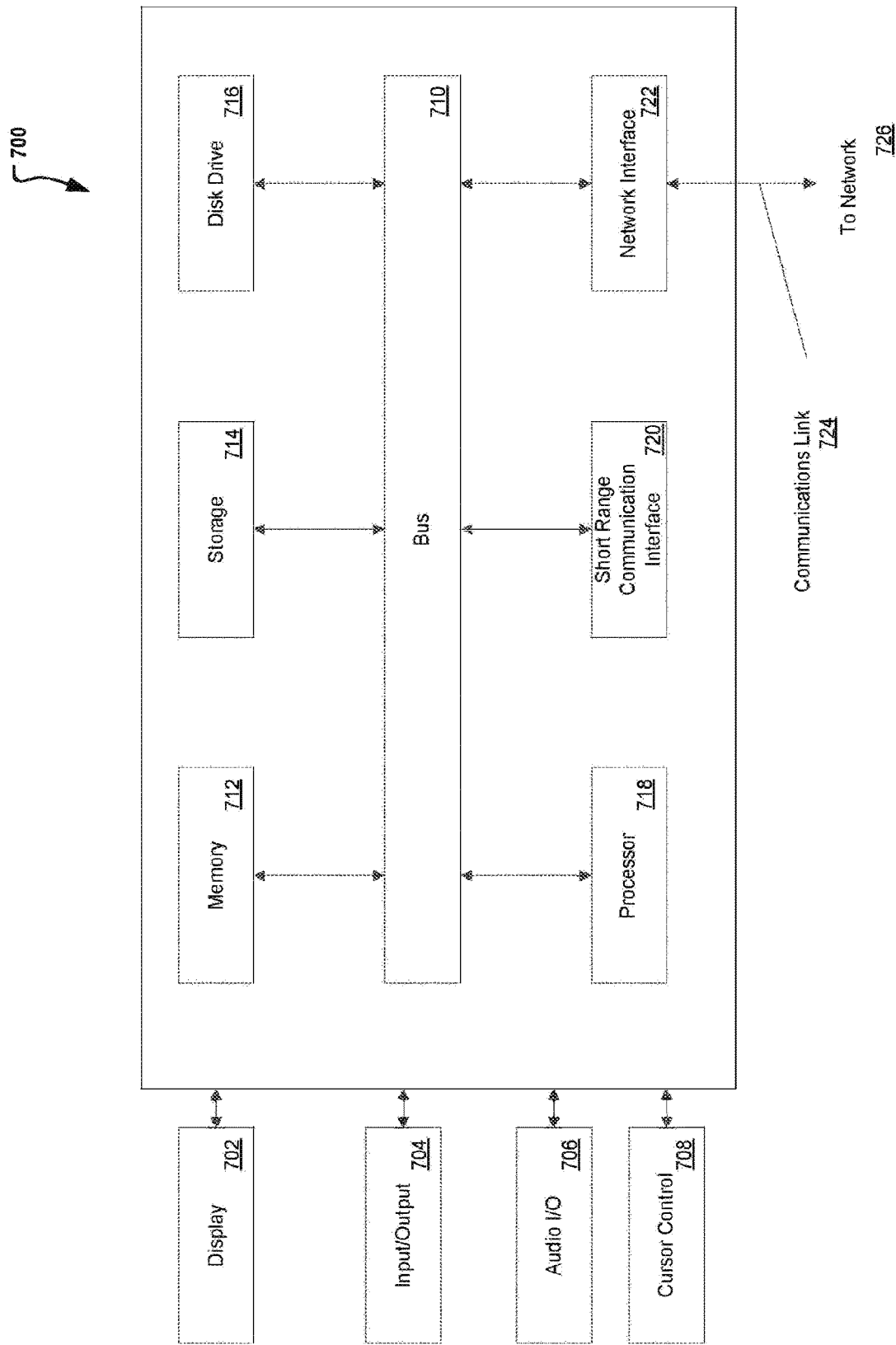
FIG. 7 illustrates an example block diagram of a computer system suitable for implementing one or more devices of the communication systems of FIGS. 1-6.

FIG. 7 illustrates an example computer system 700 in block diagram format suitable for implementing on one or more devices of the system in FIG. 1. In various implementations, a device that includes computer system 700 may comprise a computing device (e.g., a smart or mobile device, a computing tablet, a personal computer, laptop, wearable device, PDA, server, etc.) that is capable of communicating with a network 726. A service provider and/or a content provider may utilize a network computing device (e.g., a network server or third-party service provider computer 612) capable of communicating with the network 726. It should be appreciated that each of the devices utilized by users, service providers, and content providers may be implemented as computer system 700 in a manner as follows.

Additionally, as more and more devices become communication capable, such as new smart devices using wireless communication to report, track, message, relay information and so forth, these devices may be part of computer system 700. For example, windows, walls, and other objects may double as touch screen devices for users to interact with. Such devices may be incorporated with the systems discussed herein.

Computer system 700 may include a bus 710 or other communication mechanisms for communicating information data, signals, and information between various components of computer system 700. Components include an input/output (I/O) component 704 that processes a user action, such as selecting keys from a keypad/keyboard, selecting one or more buttons, links, actuatable elements, etc., and sending a corresponding signal to bus 710. I/O component 704 may also include an output component, such as a display 702 and a cursor control 708 (such as a keyboard, keypad, mouse, touchscreen, etc.). In some examples, I/O component 704 may include an image sensor for capturing images and/or video, such as a complementary metal oxide semiconductor (CMOS) image sensor, and/or the like. An audio input/output component 706 may also be included to allow a user to use voice for inputting information by converting audio signals. Audio I/O component 706 may allow the user to hear audio. A transceiver or network interface 722 transmits and receives signals between computer system 600 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 718, which may be a micro-controller, digital signal processor (DSP), or other processing component, that processes these various signals, such as for display on computer system 700 or transmission to other devices over a network 726 via a communication link 724. Again, communication link 724 may be a wireless communication in some embodiments. Processor 718 may also control transmission of information, such as cookies, IP addresses, images, and/or the like to other devices.

Components of computer system 700 also include a system memory component 714 (e.g., RAM), a static storage component 714 (e.g., ROM), and/or a disk drive 716. Computer system 700 performs specific operations by processor 718 and other components by executing one or more sequences of instructions contained in system memory component 712. Logic may be encoded in a computer readable medium, which may refer to any medium that participates in providing instructions to processor 718 for execution. Such a medium may take many forms, including but not limited to, non-volatile media, volatile media, and/or transmission media. In various implementations, non-volatile media includes optical or magnetic disks, volatile media includes dynamic memory such as system memory component 712, and transmission media includes coaxial cables, copper wire, and fiber optics, including wires that comprise bus 710. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 700 may also include a short-range communications interface 720. Short range communications interface 720, in various embodiments, may include transceiver circuitry, an antenna, and/or waveguide. Short range communications interface 720 may use one or more short-range wireless communication technologies, protocols, and/or standards (e.g., WIFI, Bluetooth®, Bluetooth Low Energy (BLE), infrared, NFC, etc.).

Short range communications interface 720, in various embodiments, may be configured to detect other devices (e.g., primary user device 632, merchant device 602, etc.) with short range communications technology near computer system 700. Short range communications interface 720 may create a communication area for detecting other devices with short range communication capabilities. When other devices with short range communications capabilities are placed in the communication area of short range communications interface 720, short range communications interface 720 may detect the other devices and exchange data with the other devices. Short range communications interface 720 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 720 may identify a local area network using a short-range communications protocol, such as Wi-Fi, and join the local area network. In some examples, computer system 700 may discover and/or communicate with other devices that are a part of the local area network using short range communications interface 720. In some embodiments, short range communications interface 720 may further exchange data and information with the other devices that are communicatively coupled with short range communications interface 720.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 724 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants/vendors and customers; however, a customer or consumer can pay, or otherwise interact with any type of recipient, including charities and individuals. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory storing instructions;
   one or more hardware processors coupled to the non-transitory memory and configured to read the instructions from the non-transitory memory to cause the system to perform operations comprising:
   generating a tagged set from websites randomly selected;
   retrieving a website with information available for processing;
   analyzing website content from the website using a first model, wherein the first model uses the tagged set and a content-based feature set associated with the website;
   analyzing the website content using a second model, wherein the second model uses a technology-based feature set associated with one or more technologies embedded in the website; and
   classifying the website based on the analysis using the first and second models in a multistage classification, wherein an output of the analysis from the first model at a first stage of the multistage classification is further refined using the second model at a second stage of the multistage classification.

2. The system of claim 1, wherein the analyzing of the website content using the second model includes crawling the website for specific technological content.

3. The system of claim 1, wherein the content-based feature set used in the first model includes predefined features.

4. The system of claim 1, wherein the technology-based feature set used in the second model includes unlabeled observations.

5. The system of claim 4, wherein the unlabeled observations are transformed into input features descriptive of an object.

6. The system of claim 1, wherein the content-based feature set and the technology-based feature set are developed using two distinct domains.

7. The system of claim 1, wherein the content-based feature set is identified using a statistical based methodology.

8. A method, comprising:
   generating a tagged set from websites;
   retrieving a website with information available for processing;
   analyzing website content from the website using a first model, wherein the first model uses the tagged set and a content-based feature set associated with the website;
   analyzing the website content using a second model, wherein the second model uses a technology-based feature set associated with one or more technologies embedded in the website; and
   classifying the website based on the analysis using the first and second models in a multistage classification, wherein an output of the analysis from the first model at a first stage of the multistage classification is further refined using the second model at a second stage of the multistage classification.

9. The method of claim 8, wherein the analyzing of the website content using the second model includes crawling the website for specific technological content.

10. The method of claim 8, wherein the content-based feature set used in the first model includes predefined features.

11. The method of claim 8, wherein the technology-based feature set used in the second model includes unlabeled observations.

12. The method of claim 11, wherein the unlabeled observations are transformed into input features descriptive of an object.

13. The method of claim 8, wherein the content-based feature set and the technology-based feature set are developed using two distinct domains.

14. The method of claim 8, wherein the content-based feature set is identified using a statistical based methodology.

15. A non-transitory machine-readable medium having instructions stored thereon, the instructions executable to cause performance of operations comprising:
   generating a tagged set from websites;
   retrieving a website with information available for processing;
   analyzing website content from the website using a first model, wherein the first model uses the tagged set and a content-based feature set associated with the website;
   analyzing the website content using a second model, wherein the second model uses a technology-based feature set associated with one or more technologies embedded in the website; and
   classifying the website based on the analysis using the first and second models in a multistage classification, wherein an output of the analysis from the first model at a first stage of the multistage classification is further refined using the second model at a second stage of the multistage classification.

16. The non-transitory machine-readable medium of claim 15, wherein the analyzing of the website content using the second model includes crawling the website for specific technological content.

17. The non-transitory machine-readable medium of claim 15, wherein the content-based feature set used in the first model includes predefined features.

18. The non-transitory machine-readable medium of claim 15, wherein the technology-based feature set used in the second model includes unlabeled observations.

19. The non-transitory machine-readable medium of claim 18, wherein the unlabeled observations are transformed into input features descriptive of an object.

20. The non-transitory machine-readable medium of claim 15, wherein the content-based feature set and the technology-based feature set are developed using two distinct domains.

* * * * *